United States Patent [19]

Kodera et al.

[11] 4,294,935

[45] Oct. 13, 1981

[54] METHOD OF PRODUCING ETHYLENE-VINYL ALCOHOL COPOLYMER FILM

[75] Inventors: Yuji Kodera; Kyoichiro Ikari; Shunji Miyake, all of Kurashiki, Japan

[73] Assignee: Kuraray Company, Limited, Kurashiki, Japan

[21] Appl. No.: 105,412

[22] Filed: Dec. 19, 1979

[30] Foreign Application Priority Data

Dec. 29, 1978 [JP] Japan ............................ 53-161912
Aug. 22, 1979 [JP] Japan ............................ 54-107569

[51] Int. Cl.³ .................... B29C 17/02; B29C 25/00; C08F 16/06; C08L 29/04
[52] U.S. Cl. ............................ 525/60; 264/235.8; 264/290.2
[58] Field of Search ............ 264/235.6, 235.8, 290.2, 264/210.7; 525/60

[56] References Cited

U.S. PATENT DOCUMENTS

| | | | |
|---|---|---|---|
| 3,419,654 | 12/1968 | Chiba et al. | 264/235.8 |
| 3,440,316 | 4/1969 | Miyake et al. | 264/235.8 |
| 3,585,177 | 6/1971 | Gardner et al. | 525/60 |
| 3,595,740 | 7/1971 | Geson | 525/60 |

FOREIGN PATENT DOCUMENTS

| | | | |
|---|---|---|---|
| 2425903 | 12/1975 | Fed. Rep. of Germany | 525/60 |
| 51-6276 | 1/1976 | Japan | 264/290.2 |
| 52-15570 | 2/1977 | Japan | 264/290.2 |

*Primary Examiner*—James B. Lowe
*Attorney, Agent, or Firm*—Oblon, Fisher, Spivak, McClelland & Maier

[57] ABSTRACT

An ethylene-vinylalcohol copolymer film is prepared by biaxially or multiaxially stretching a nonstretched ethylene-vinylalcohol polymer film having a moisture content of not more than 3.5%, said ethylenevinyl alcohol copolymer having an ethylene content of 20 to 55 mole % and a saponification degree of not less than 96 mole % and said stretching being conducted within a temperature range of 50° to 150° C. to such an extent that the film is expanded to an area 4 to 20 times the original area.

14 Claims, No Drawings

METHOD OF PRODUCING ETHYLENE-VINYL ALCOHOL COPOLYMER FILM

BACKGROUND OF THE INVENTION

1. Field of the Invention:

This invention relates to a method of producing biaxially or multiaxially stretched ethylene-vinyl alcohol copolymer films.

2. Description of the Prior Art

Generally, in order to improve the physical properties of plastic films, biaxial stretching has been employed and different kinds of techiques have been established for various kinds of films. However, the stretching of ethylene-vinyl alcohol copolymer films is, at best, difficult and satisfactory methods for accomplishing the same are still under development. It is believed that stretching of ethylene-vinyl alcohol copolymer is difficult or the films break or rupture because the copolymer contains a large number of hydroxyl groups in its molecules which easily form hydrogen bonds during the formation of the unstretched film.

The state-of-the-art techniques for stretching ethylene-vinyl alcohol copolymer films can be divided into two categories: (A) Stretching a film of high moisture content over a low temperature range including temperatures close to the glass transition temperature of the copolymer; and (B) Stretching a film at low moisture content over a high temperature range including temperatures close to the melting point of the copolymer. However, stretching of films over low temperature ranges and at low moisture contents has been considered difficult. For example, known embodiments of the first technique involve stretching films at a temperature from the glass transition point to 150° C. at a moisture content of not less than 4% (Japanese Patent Publication No. 43,199/1978), stretching films at a temperature of 60° C. to 160° C. at a moisture content of 8 to 30% (Japanese Patent Application Laid-open No. 15,570/1977), stretching films at a temperature of 40° to 140° C. at a moisture content of 8 to 20% (Japanese Patent Application Laid-open No. 30,670/1978) and stretching films at a temperature of 50° to 100° C. at a moisture content of 5 to 20% (Japanese Patent Application Laid-open No. 129,777/1977). Embodiments of the second technique include stretching films at a temperature of 150° C. to a temperature lower than the melting point by 5° C. at a moisture content of not more than 4% (Japanese Patent Publication No. 43,198/1978) and so on. In addition to the above described techniques, a special technique is also known in which a multilayer film which contains said copolymer layer laminated with a layer of easily stretchable thermoplastic resin is stretched.

Water can act as a plasticizer and prevent hydrogen bond formation between ethylene-vinyl alcohol copolymer molecules, making stretching easier, while at higher temperatures, hydrogen bonds are easily broken so that stretching of the film is made easy without the aid of the plasticizing effect of water. However, these methods are insufficient in increasing the molecular orientation of the film by stretching. It is believed that the unsatisfactory characteristics of ethylene-vinyl alcohol copolymer films relative to the dependency of the gas barrier properties upon humidity as well as water resistance and mechanical properties can be improved by increasing the orientation of the film molecules as well as increasing the degree of crystallinity of the film. Therefore, in order to increase the molecular orientation of the film to the highest degree, stretching at lower temperatures and at low moisture contents is desirable. However, such stretching has been difficult in the prior art.

Furthermore, with respect to oriented films formed with the aid of the plasticizing effect of water or high temperatures, the effect of orientation is disadvantageously not sufficiently revealed, and when a laminated film is stretched the process is complicated and is not economic. If the degree of orientation imparted to the film by stretching is insufficient, the extent of improvement in physical properties such as water resistance, blocking temperature, impact resistance, mechanical strength at low temperatures and gas barrier characteristics under high humidity conditions is not satisfactory and for practical purposes, the resulting film is not satisfactory.

Ethylene-vinyl alcohol copolymer films possess excellent gas barrier characteristics and eminently fulfill the function in the form of a unilayer film or laminated film of preserving food and medicines when used as a packaging material. However, commercially available unstretched ethylene-vinyl alcohol copolymer films possess unsatisfactory water resistance, blocking temperature and impact resistance and possess unsatisfactory mechanical properties at low temperatures. Moreover, the gas barrier characteristics are variable and are dependent on humidity with yet a further drawback being that the gas barrier characteristics significantly decrease under high humidity conditions. Therefore, a solution to these problems has been awaited most anxiously in order to increase the range of use of the film, and a need continues to exist for a method of improving the orientation of ethylene-vinyl alcohol films by a stretching process.

SUMMARY OF THE INVENTION

Accordingly, an object of the present invention is to provide a technique for stretching ethylene-vinylalcohol copolymer films which improves the orientation of the same.

Another object of the present invention is to provide an ethylenevinlylalcohol copolymer film of improved water resistance, blocking temperature, impact resistance and mechanical strength characteristics.

Briefly, these objects and other objects of the present invention as hereinafter will become more readily apparent can be attained by a method of producing an ethylene-vinylalcohol copolymer film which comprises biaxially or multiaxially stretching a nonstretched ethylene-vinylalcohol polymer film having a moisture content of not more than 3.5%, said ethylene-vinyl alcohol copolymer having an ethylene content of 20 to 55 mole % and a saponification degree of not less than 96 mole %, and said stretching being conducted within a temperature range of 50° to 150° C. to such an extent that the film is expanded to an area 4 to 20 times the original area.

DETAILED DESCRIPTION OF THE PREFERRED EMBODIMENT

The basis for the present invention resides in the idea that stretchability at a low moisture content and over a low temperature range probably is chiefly dependent on the degree of crystallinity of the unstretched film, and the degree of crystallinity in turn must be closely related to the density of the film. With the present invention it is now possible to stretch unstretched film under conditions in which the moisture content is as low as 2.0% or less and at relatively low temperatures, thus providing biaxially oriented films with much improved physical properties. A stretching process which achieves such results has been considered difficult to achieve in the prior art.

The present invention provides a method of producing ethylene-vinyl alcohol copolymer film, which involves biaxially or multiaxially stretching a nonstretched film having a moisture content of not more than 3.5% and which is formed from an ethylene-vinyl alcohol copolymer having an ethylene content of 20 to 55 mole % and a saponification degree of not less than 96 mole %, said stretching being conducted within a temperature range of 50° to 150° C. to such an extent that the film area expands 4 to 20 times its original area. If necessary stretching is followed by heat treatment at a temperature in the range between 100° C. and a temperature lower than the melting point of the copolymer by 10° C.

The ethylene-vinyl alcohol copolymer which is the raw material for the film of the present invention must have an ethylene content of 20 to 55 mole % and a saponification degree of not less than 96 mole %. If the ethylene content is greater than 55 mole %, stretching tends to become difficult and the resulting film is insufficiently stiff. Moreover, while the humidity dependency of gas barrier characteristics decreases, the gas barrier characteristics on the whole decrease, so that the required level of film peformance cannot be attained. If the ethylene content is less than 20 mole %, the water resistance and blocking temperature of the film will be inferior and the gas barrier characteristics under high humidity conditions will not be significantly improved by stretching. Therefore, it is especially preferable that the ethylene content be within the range of 30 to 45 mole %. Moreover, if the degree of saponification is less than 96 mole %, the water resistance and blocking temperature and gas barrier characteristics become insufficient and at the same time the stiffness and processability of the film becomes inadequate. Therefore, a degree of saponification of not less than 98 mole % is preferred.

Unstretched ethylene-vinyl alcohol copolymer film can be produced from melted resin pellets by extruding the same through a T die (flat die) or a ring die using a screw type or plunger type extruder. In the extrusion process, it is important to obtain films which have an especially low degree of crystallinity. For that purpose, when a T die is used, for instance, the distance between the lip of the die and the point of contact with the casting roll and the ratio of the speed of extrusion to the casting drum as well as the surface temperature of the cooling roll which is maintained by the circulation of brine or some other cooling medium, are all predetermined factors which depend upon the thickness of the unstretched film to be produced. Moreover, in the casting process, the film is brought into close contact with the cooling roll by means of an air slit or a nip roll so that rapid cooling may be achieved in order to lower the film temperature to 60° C. or below within one second after extrusion from the die. In this way, unstretched films having a very low degree of crystallinity can be obtained.

When the ethylene content of the film is kept constant, a certain relationship exists between the degree of crystallinity and the density of the film produced, with the density increasing as the degree of crystallinity increases. As a result of investigations into the relationship between the conditions under which the unstretched film is formed and its density and into the relationship between the density of the film and its stretchability, it has become apparent that when the density of the film exceeds the value defined by formula (1), $$d < 1.320 - 4.3 \times 10^{-3} X \text{ (g/ml)} \tag{1}$$

where d is density at 25° C. and X is the ethylene content of the film in mole %, stretching at temperatures less than 150° C. causes a large degree of neck-in and frequent rupture of the film. However, those films which have a density value satisfying expression (1), in other words a low degree of crystallinity, can be stretched under low moisture content conditions and even at low temperatures (50° C.) close to the glass transition point.

The upper limit allowable for the moisture content of unstretched films which are to be stretched in the present invention is 3.5%. At higher moisture contents, the effect of orientation diminishes and films with unsatisfactory physical properties are obtained. In order to achieve a higher orientation effect, it is preferrable that the moisture content be not more than 2.0%. This value corresponds approximately to the moisture content which results from absorption of atmospheric moisture by the hygroscopic ethylene-vinyl alcohol copolymer when the copolymer is melt-extruded at a high temperature and the film is subjected to stretching without conditioning of the moisture content. Such a low moisture content condition can also contribute to reduction in production costs because it obviates a moisture conditioning process as well as a drying process after stretching.

Stretching of the film is conducted within the temperature range of 50° to 150° C. While stretching is easier at higher temperatures because hydrogen bond dissociation occurs more easily, the degree of orientation of molecules in the film decreases as the stretching temperature increases. When the stretching ratio is the same, the degree of orientation of the film produced increases as the temperature decreases. The present invention is characterized in that stretching is conducted at temperatures within a range which includes low temperatures close to the glass transition temperature which is the theoretically lowest possible stretching temperature. Stretching of this type has so far been considered to be very difficult to achieve, but is now possible when unstretched film with a very low degree of crystallinity is used. As a result, a film more highly oriented than conventional ones can be obtained.

Stretching of the film over the range of 50-100° C. is preferred from the view point of molecular orientation. At temperatures less than 50° C., the film is apt to break during stretching, while at tempertures higher than 150° C., the degree of orientation is markedly decreased.

The practical stretching ratio factor in the present process should be within the range of 4 to 20 times in terms of its area ratio. If the ratio is less than 4, uneven stretching and thus insufficient orientation may result. On the other hand, if the ratio exceeds 20, the film is apt to rupture during stretching.

In the stretching of the film, well known processes for stretching plastic films may be employed. In the case of flat films, for instance, simultaneous or stepwise biaxial stretching using a tenter is possible, and in the case of tubular film, multiaxial stretching by inflation under pressure can be employed. The stretched films thus obtained may be used as they are as a shrinkable film. However, in order to obtain excellent films with much improved dimensional stability, stiffness, gas barrier characteristics under high humidity conditions and water resistance, for instance, it is desirable to heat treat the film following stretching. The heat treatment can be done when the film is either in a fixed or restrained state or in a relaxed state. Heat treatment in a relaxed state is preferably conducted with the shrinkage of the film being limited to 20% or less in length in the width and length directions of the film. Heat treatment of the film at a temperature less than 100° C. will be ineffective, resulting only in a slight improvement in the stiffness of the film, in the gas barrier characteristics under high humidity conditions, in the water resistance, and in the dimensional stability. When the heat treatment temperature is greater than a temperature less than the melting point by 10° C., sticking of the film to the apparatus causes the heat treatment to become difficult. If necessary, moisture conditioning of the film may be employed after the heat treatment.

The heat treatment promotes hydrogen bond formation between film molecules and accordingly greatly increases the degree of crystallinity. For example, an X-ray diffraction pattern of a film biaxially stretched at 70° C. and then heat-treated at 140° C. shows distinct crystal spots which indicate remarkable improvement in crystallinity by the heat treatment. On the other hand, crystallinity changes insignificantly by low temperature stretching alone.

The film produced by the process of the present invention has improved gas barrier characteristics in comparison to unstretched films and films which are stretched at high moisture content or at higher temperatures. The gas barrier characteristics of the present product films are less dependent upon humidity, and especially losses in gas impermeability under high humidity conditions can be prevented. Moreover, the water resistance, blocking temperature and mechanical properties of the film are also improved. Still further, the stiffness of the product film, which is an important factor in high speed processing such as bag production, is improved. These improvements are all thought to result from improvement in the degree of orientation and crystallinity of the film. Although ethylene-vinyl alcohol copolymer films whose basic characteristics make possible the prevention of deterioration and discoloration of food, the prolongation of shelf life of food and flavor preservation, are the best food packaging materials of many plastic films, the present films show even a greater improvement in performance characteristics because of the improved physical properties obtained in the films of the present invention.

The film product of the present invention can also be used for packaging medicines, textile products, miscellaneous goods and machine parts by taking advantage of the oil resistance and oxygen barrier characteristics of the films. In industrial applications, the film may be used for making polarizers, mold release films, metallizing films, infrared ray barrier films, and the like. The present films can also be used in the form of unilayer films, composite films made by laminating or coating a film base with a variety of plastic materials, or aluminum foil-clad films.

Since unstretched films of low moisture content are used as they are, the method of the present invention, when applied to industrial production processes, can contribute to rationalization thereof by omitting the moisture conditioning step prior to stretching, or to reduction in production costs by energy savings resulting from lower temperature stretching.

Having generally described this invention, a further understanding can be obtained by reference to certain specific examples which are provided herein for purposes of illustration only and are not intended to be limiting unless otherwise specified.

EXAMPLES

In the following examples, the physical properties of the films produced were measured by the following methods.

Density: Determined at a temperature of 25° C. by the floatation method using benzene and carbon tetrachloride and expressed in g/ml.

Melting point: Temperature corresponding to the endothermic peak revealed by differential thermal analysis programmed at a rate of temperature increase of 10° C. per minute using 10 mg of the sample.

Tensile strength: Determined on a specimen having a width of 15 mm under conditions of 20° C. and 65% RH (relative humidity) using a SHIMADZU AUTOGRAPH IM-100 (Shimadzu Seisakusho Ltd.) with a grip gap of 50 mm and at a rate of stretching of 500 mm/minute, expressed in kg/mm$^2$.

Young's modulus: Determined under conditions of 20°, $\gamma$% RH, a grip gap of 50 mm and a rate of stretching of 5 mm/minute using the same tester and the same test specimen as for the tensile strength, and expressed in kg/mm$^2$.

Impact strength: Determined under conditions of 20° C. and 65% RH using a FILM IMPACT TESTER (Toyo Seiki Seisakusho Co., Ltd.) and expressed in kg/cm/10$\mu$.

Water vapor transmission rate: A glass cup having an opening of a known area and filled with calcium chloride as a moisture absorbing agent was covered tightly with the test film and the whole was allowed to stand in a vessel maintained at a constant temperature of 40° C. and a constant relative humidity of 90%. The cup was weighed at 24-hour intervals and the amount of water vapor transmitted per 24 hours was determined and expressed in g/m$^2$.24 hrs.30$\mu$.

Oxygen transmission rate: Determined under conditions of 20° C. and 0% RH or 100% RH using an OX-TRAN 100 (Modern Controls, Inc.) and expressed in cc/m$^2$.24 hrs.10$\mu$.

Temperature at which blocking occurs in hot water: Temperature (°C.) at which two touching test film specimens immersed in hot water become incapable of being separated from each other because of partial adhesion, i.e. blocking.

Example 1 & Comparative Example 1

An ethylene-vinyl alcohol copolymer having an ethylene content of 32 mole %, a saponification degree of 99.6 mole %, a moisture content of 0.3% by weight and a melting point of 182° C. (in an anhydrous state) was melt-extruded through a T die onto a casting drum having a cooling surface maintained at 15° C. and, just when the film came into contact with the casting drum, cool air at 15° C. was blown through an air slit at a rate of 30 meters per second against the film on the side opposite to the side in contact with the drum, so that the film was cooled rapidly. The unstretched film produced had a density of 1.173, a moisture content of 0.1% by weight and a thickness of 150 microns. The unstretched film was subjected to simultaneous biaxial orientation using a tenter type biaxial stretching machine at a temperature of 85° C., the stretching being threefold both in the machine direction and in the transverse direction. Stretching could be conducted without difficulty, giving a uniformly stretched film. The stretched film obtained was subjected to heat treatment at 150° C. in a restrained state. The physical properties of the product film are shown in Table 1 and the film had a good appearance and improved physical characteristics. By comparison, the physical properties of the unstretched film which was simply heat-treated at 150° C. are shown in Table 1 in the column "Comparative Example 1".

It is evident from the data shown in Table 1 that the biaxially oriented film produced by the method of the present invention has improved physical properties.

Example 2 & Comparative Example 2

The same ethylene-vinyl alcohol copolymer as used in Example 1 was extruded through a T die and fed onto a casting drum having a cooling surface of 45° C., with or without using an air slit under varied conditions, to produce unstretched films having various density values. These films were simultaneously, biaxially stretched using a tenter type biaxial stretching machine at various temperatures, the degree of stretching being 2.5 times each in the longitudinal and in the transverse direction. The results are shown in Table 2.

The unstretched film having a density of 1.195 could be stretched only at higher temperatures and, as revealed by the oxygen permeability data, the orientation effect caused by stretching was not sufficient.

EXAMPLE 3

The unstretched film used in Example 1 was stretched threefold at a temperature of 70° C. in the longitudinal direction by a roll type lengthwise stretching machine and then stretched threefold at a temperature of 75° C. in the transverse direction by a tenter. Each stretching step could be done without difficulty and a uniformly stretched film was obtained. After the stretching, the film was heat-treated at 150° C. in a fixed state. The physical properties of the so produced film are shown in Table 1. It is evident that the film had a good appearance and improved physical characteristics.

Comparative Example 3

The same unstretched film used in Example 1 was stretched lengthwise 1.5 times at a temperature of 80° C. by a roll type lengthwise stretching machine and then stretched crosswise by a factor of 2 at a temperature of 85° C. by a tenter. Each stretching step was performed without difficulty but an unevenly stretched film unsuitable for practical purposes was obtained. The unevenness of the film is thought to have resulted from the low stretching ratio used.

Example 4

The same unstretched film used in Example 1, with the moisture content being varied, was stretched 3.5 times at 55° C. by a roll type lengthwise stretching machine and then stretched 3.5 times at a temperature of 65° C. by a tenter. Each stretching step could be carried out without difficulty and a uniformly stretched film was obtained. The stretched films were subjected to heat treatment at 150° C. in a fixed state. The physical properties of the product film are shown in Table 3. When the moisture content was more than 4%, the orientation effect was not sufficient and only a slight improvement in gas barrier characteristics was produced. When the moisture content was in the range of 3.5%-4%, the improvement was sometimes distinct and sometimes indistinct. Only when the moisture content was not more than 3.5% was the orientation effect achieved satisfactory.

Example 5

The same ethylene-vinyl alcohol copolymer as was used in Example 1 was extruded by an extruder with a diameter of 60 mm through a T die at 220° C. and then fed onto a casting drum having a cooling surface at 30° C. and rapidly cooled by means of an air slit with the film kept in close contact with the drum surface. The unstretched film produced had a moisture contnet of 0.1% by weight and a thickness of 150 microns. The unstretched film was biaxially stretched simultaneously at a temperature of 100° C. by a tenter type biaxial stretching machine, the degree of stretching being 4 times in each direction. After stretching, the film was heat-treated at 150° C. with shrinkage of 10% in both the longitudinal and transverse directions of the film. The physical properties of the so produced film are shown in Table 4. The film had a good appearance and improved physical characteristics.

Example 6

The same ethylene-vinyl alcohol copolymer as was used in Example 1 was extruded through a circular die and allowed to ride on a mandrel cooled to 20° C. with water circulating within. The inside surface of the film was cooled indirectly with water by sliding the same over the mandrel and at the same time the film as cooled by means of air jets surrounding the mandrel. The unstretched film formed had a density of 1.178, a moisture content of 0.2% by weight and a thickness of 120 microns. The unstretched film was heated to 120° C. and stretched so that the area was expanded by a factor of 9, and then heat-treated at 160° C. in a fixed state. The physical properties of the film so obtained are shown in Table 4. The film had a good appearance and improved physical characteristics.

Example 7 & Comparative Example 4

An ethylene-vinyl alcohol copolymer having an ethylene content of 42 mole %, a saponification degree of 99.5 mole % and a moisture content of 0.3% by weight was extruded through a T die and fed onto a casting drum having a cooling surface at 20° C. and, just when the film came into contact with the casting drum, cool air at 15° C. was blown against the film on the side opposite to the side in contact with the drum, so that the film was rapidly cooled. The unstretched film formed had a density of 1.128, a moisture content of 0.2% by weight and a thickness of 200 microns. The unstretched film was biaxially stretched simultaneously at a temperature of 70° C. using a tenter type biaxial stretching machine, the stretch being threefold each in the longitudinal and in the transverse directions. The stretching was accomplished without difficulty and gave a uniformly stretched film. After the stretching, the film was subjected to heat treatment at 130° C. in a fixed state.

The physical properties of the product film are shown in Table 4. The film had a good appearance and improved physical properties. By comparison, the unstretched film was subjected only to a heat treatment at 130° C. The physical properties of this film are shown in Table 4 in the column "Comparative Example 4".

EXAMPLE 8

The unstretched film obtained in Example 7 was adjusted to a moisture content of 2.7% by weight and stretched lengthwise by a factor of 3 at 60° C. by a roll type lengthwise stretching machine and then 3.5 times in the transverse direction at 70° C. by a tenter. The stretching was accomplished without difficulty and gave a uniformly stretched film. After the stretching, the film was heat-treated at 130° C. with a shrinkage of 5% in each of the longitudinal and transverse directions. The physical properties of the film thus obtained are shown in Table 4. The film had a good appearance and improved physical characteristics.

Comparative Example 5

The same unstretched film as was used in Example 8 was subjected to biaxial stretching at a temperature of 45° C. using a tenter type biaxial stretching machine, the intended stretch being 2.5 times in both the longitudinal and transverse directions. Rupture occured frequently and thus stretching was impracticable.

TABLE 1

| Item | | Example 1 | Comparative Example 1 (unstretched film) | Example 3 |
|---|---|---|---|---|
| Film thickness | μ | 17 | 150 | 23 |
| Tensile strength: | | | | |
| Lengthwise | kg/mm² | 17.7 | 7.5 | 13.5 |
| Transverse | kg/mm² | 16.7 | 6.2 | 18.2 |
| Young's modulus: | | | | |
| Lengthwise | kg/mm² | 390 | 200 | 350 |
| Transverse | kg/mm² | 385 | 190 | 390 |
| Impact strength | kg-cm/10μ | 5.2 | 2.0 | 4.6 |
| Water vapor transmission rate | g/m².24hr.30μ | 20 | 50 | 25 |
| Oxygen transmission rate | | | | |
| 0% RH | cc/m².24hr.10μ | 0.1 | 0.3 | 0.1 |
| 100% RH | cc/m².24hr.10μ | 5.3 | 35 | 6.8 |

TABLE 2

| | Example 2 | Example 2 | | | Comparative Example 2 |
|---|---|---|---|---|---|
| Density of unstretched film | 1.175 | 1.180 | | | 1.195 |
| Temperature range in which stretching was possible | 60~130° C. | 65~130° C. | | | 135° C.~160° C. |
| Temperature at which stretching was conducted for samples to be tested for physical properties | 85° C. | 85° C. | 100° C. | 120° C. | 135° C. |
| Oxygen transmission rate at 20° C., 100%RH | 5.0 | 5.1 | 6.3 | 9.0 | 16.0 |

TABLE 3

| | Example 4 | Example 4 | Example 4 | Example 4 | Example 4 |
|---|---|---|---|---|---|
| Moisture content of unstretched film (%) | 0.9 | 2.7 | 3.4 | 3.8 | 4.3 |
| Tensile strength (kg/mm²) | 24.5/22.1 | 24.5/22.8 | 24.2/23.1 | 22.1/20.6 | 16.4/17.9 |
| Young's modulus (kg/mm²) | 390/400 | 415/395 | 380/395 | 380/354 | 320/335 |
| Water vapor Transmission rate (g/m².24hrs 30μ) | 17 | 17 | 19 | 20 | 25 |
| Oxygen transmission rate (20° C., 100% RH) | 4.3 | 4.0 | 4.2 | 8.5 | 15.8 |

TABLE 4

| Item | | Example 5 | Example 6 | Example 7 | Comparative Example 4 (unstretched film) | Example 8 |
|---|---|---|---|---|---|---|
| Film thickness | μ | 10 | 14 | 16 | 150 | 15 |
| Tensile strength: | | | | | | |
| Lengthwise | kg/mm² | 22.3 | 18.0 | 14.5 | 7.1 | 16.0 |
| Transverse | " | 23.5 | 17.5 | 14.0 | 4.5 | 15.8 |
| Young's modulus: | | | | | | |
| Lengthwise | kg/mm² | 410 | 400 | 350 | 190 | 360 |
| Transverse | " | 415 | 380 | 345 | 190 | 355 |

TABLE 4-continued

| Item | | Example 5 | Example 6 | Example 7 | Comparative Example 4 (unstretched film) | Example 8 |
|---|---|---|---|---|---|---|
| Impact strength | kg/cm/10μ | 6.3 | 4.8 | 5.0 | 2.5 | 5.2 |
| Water vapor transmission rate | g/m². 24hr 30μ | 17 | 22 | 13 | 20 | 14 |
| Oxygen transmission rate | | | | | | |
| 0% RH | cc/m². 24hr | 0.1> | 0.1 | 1.8 | 2.2 | 1.7 |
| 100% RH | 10μ | 2.6 | 5.5 | 7.5 | 25 | 8.0 |
| Blocking temperature (in hot water) | °C. | 95°< | 95°< | | | |

Having now fully described the invention, it will be apparent to one of ordinary skill in the art that many changes and modifications can be made thereto without departing from the spirit or scope of the invention as set forth herein.

What is claimed is:

1. A method of producing an ethylene-vinyl alcohol copolymer film, which comprises: biaxially or multiaxially stretching a nonstretched ethylene-vinylalcohol polymer film having a moisture content of not more than 3.5%, said ethylene-vinyl alcohol copolymer having an ethylene content of 20 to 55 mole % and a saponification degree of not less than 96 mole %, and said stretching being conducted within a temperature range of 50° to 150° C. to such an extent that the film is expanded to an area 4 to 20 times the original area.

2. The method of claim 1, wherein the ethylene-vinyl alcohol copolymer has an ethylene content of 30 to 45 mole %.

3. The method of claim 1, wherein the ethylene-vinyl alcohol copolymer has a saponification degree of not less than 98 mole%.

4. The method of claim 1, wherein the unstretched film formed from said copolymer has a density which satisfies the condition:

$$d < 1.320 - 4.3 \times 10^{-3} X \text{ (g/ml)}$$

wherein d is density at 25° C. and X is the ethylene content of the copolymer in mole %.

5. The method of claim 1, wherein the unstretched film formed from said copolymer has a moisture content of not more than 2.0%.

6. The method of claim 1, wherein stretching is conducted within a temperature range of 50° to 100° C.

7. The method of claim 1, wherein said film is biaxially stretched simultaneously in the longitudinal and transverse directions.

8. The method of claim 1, wherein said film is biaxially stretched in separate steps in the longitudinal and transverse directions at the same temperature.

9. The method of claim 1, wherein said film is biaxially stretched in separate steps in the longitudinal and transverse directions at different temperatures.

10. The ethylene-vinylalcohol copolymer film produced by the process of claim 1.

11. A method of producing an ethylene-vinyl alcohol copolymer film, which comprises: biaxially or multiaxially stretching a nonstretched ethylene-vinylalcohol copolymer film having a moisture content of not more than 3.5%, said ethylene-vinyl alcohol copolymer having an ethylene content of 20 to 55 mole % and a saponification degree of not less than 96 mole %, and said stretching being conducted within a temperature range of 50° to 150° C. to such an extent that the film is expanded to an area 4 to 20 times the original area; and heat treating said stretched film at a temperature in the range between 100° C. and a temperature lower than the melting point of said copolymer by 10° C.

12. The method of claim 11, wherein said stretched film is heat treated in a fixed state.

13. The method of claim 11, wherein said stretched film is heat treated in a relaxed state under controlled conditions such that the shrinkage of the film upon heating does not exceed 20%.

14. The ethylene-vinylalcohol copolymer film produced by the process of claim 11.

* * * * *